United States Patent [19]

Takahashi et al.

[11] Patent Number: 5,202,860
[45] Date of Patent: Apr. 13, 1993

[54] MAGNETO-OPTIC REPRODUCING DEVICE USING RIGHT AND LEFT CIRCULARLY POLARIZED LIGHT

[75] Inventors: Akira Takahashi, Nara; Yoshiteru Murakami, Nishinomiya; Junsaku Nakayima, Yamatotakada; Kenji Ohta, Kitakatsuragi, all of Japan

[73] Assignee: Sharp Kabushiki Kaisha, Osaka, Japan

[21] Appl. No.: 664,183

[22] Filed: Mar. 4, 1991

[30] Foreign Application Priority Data

Mar. 5, 1990 [JP] Japan ................................ 2-53978
Mar. 5, 1990 [JP] Japan ................................ 2-53979

[51] Int. Cl.$^5$ .................... G11B 11/00; G11B 5/127; G01J 4/00
[52] U.S. Cl. .................... 369/13; 369/110; 360/114; 360/59; 356/369
[58] Field of Search .................... 369/13, 110, 112, 19, 369/102, 116, 124; 360/59, 114; 365/122; 356/350, 364, 366, 367, 368, 369

[56] References Cited

U.S. PATENT DOCUMENTS

| | | | |
|---|---|---|---|
| 4,410,277 | 10/1983 | Yamamoto | 360/114 |
| 4,519,708 | 5/1985 | Perlmutter et al. | 356/350 |
| 4,638,470 | 1/1987 | Connell | 369/13 |
| 4,774,615 | 9/1988 | Revelli | 369/13 |
| 4,823,220 | 4/1989 | Milster | 369/13 |
| 4,933,924 | 6/1990 | Yonekubo | 369/13 X |
| 4,937,801 | 6/1990 | Miura | 369/13 |
| 4,989,189 | 1/1991 | Sander | 369/13 |
| 5,020,041 | 5/1991 | Nakao et al. | 369/13 |
| 5,038,321 | 8/1991 | Van Zeghbroeck | 369/13 X |
| 5,043,960 | 8/1991 | Nakao et al. | 369/13 |
| 5,058,099 | 10/1991 | Murakami et al. | 369/288 |

FOREIGN PATENT DOCUMENTS

| | | | |
|---|---|---|---|
| 0380329 | 8/1990 | European Pat. Off. | |
| 0414440A2 | 2/1991 | European Pat. Off. | |
| 60-35351 | 2/1985 | Japan. | |
| 0145421 | 11/1986 | Japan | 369/13 |
| 0279986 | 5/1988 | Japan | 369/13 |
| 1142501 | 2/1969 | United Kingdom | 356/367 |
| 1173901 | 12/1969 | United Kingdom | 356/367 |

OTHER PUBLICATIONS

A Magneto–Optical Disk for Readout Using Circular Dichroism Effect, Japan Applied Magnetic Society vol. 13, No. 2, 1989.

*Primary Examiner*—John W. Shepperd
*Assistant Examiner*—Edward H. Sikorski
*Attorney, Agent, or Firm*—Donald Brown; Robert F. O'Connell

[57] ABSTRACT

A reproducing optical device for a magneto-optical recording medium related to the present invention having light sources that emit linearly polarized lights towards a magneto-optical recording medium, polarization directions of the linearly polarized lights being mutually orthogonal. A quarter wavelength plate disposed between the recording medium and the light sources converts each of the linearly polarized lights into right and left circularly polarized lights respectively. Corresponding to recorded information, the recording medium has magnetized sections that are magnetized in a perpendicularly upward and downward direction with respect to a medium surface. Moreover, the recording medium displays the property of circular dichroism. When the right circularly polarized light and the left circularly polarized light are reflected off the recording medium, a first and a second photodetector generate a first and a second reproduced signal respectively, based on variation in reflected light intensity of each of the circularly polarized lights. This variation corresponds to the upward and the downward magnetization directions of the magnetized sections and is due to the circular dichroism effect. There is a phase difference of half a cycle between the first and the second reproduced signal and the signals vary inversely with respect to each other. Consequently, disk noise is cancelled by differentially amplifying the first and the second reproduced signal, and an SN ratio of a reproduced signal thereby can be improved.

31 Claims, 9 Drawing Sheets

FIG. 6(c) CLOCK 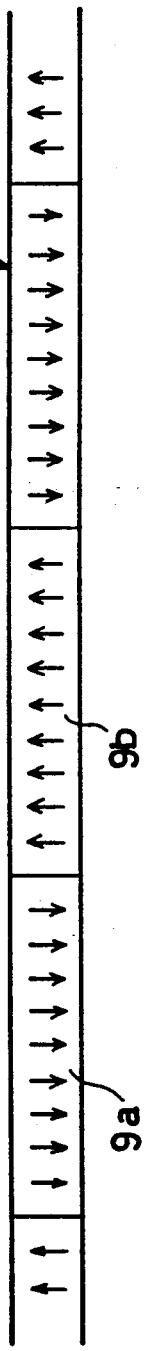
FIG. 6(d) $I_1$ 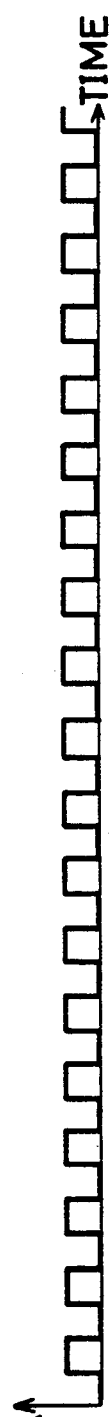
FIG. 6(e) $I_2$ 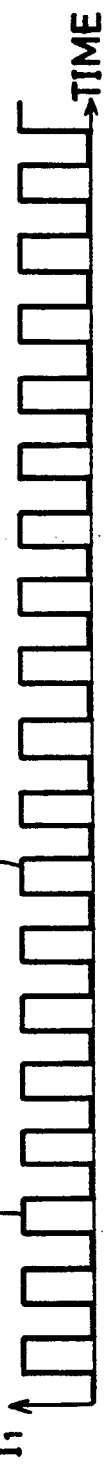
FIG. 6(f) $I_R$ 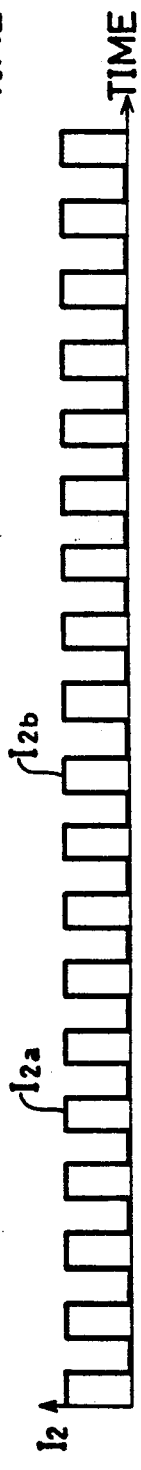
FIG. 6(g) $S_1$ 
FIG. 6(h) $S_2$ 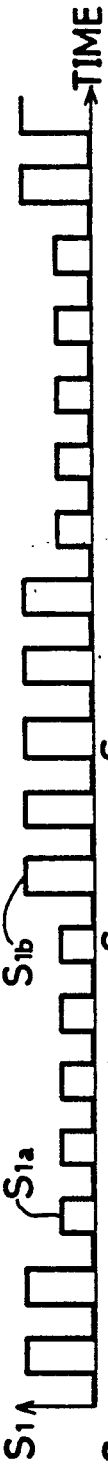

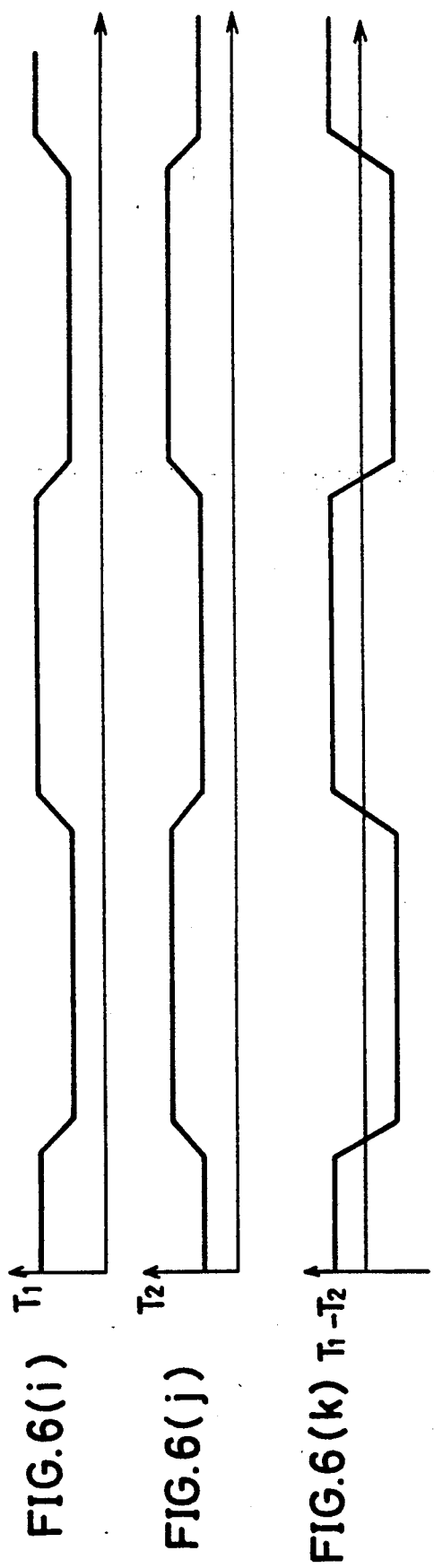
FIG.6(i) T1
FIG.6(j) T2
FIG.6(k) T1-T2

MAGNETO-OPTIC REPRODUCING DEVICE USING RIGHT AND LEFT CIRCULARLY POLARIZED LIGHT

FIELD OF THE INVENTION

The present invention relates to a reproducing optical device for a magneto-optical recording medium, and more specifically to a reproducing optical device that generates a reproduced signal by differentially amplifying magneto-optical signals detected using the circular dichroism effect of magnetic substances.

BACKGROUND OF THE INVENTION

An optical disk utilizing a thin rare-earth transition metal alloy film as a recording medium is in a practical application stage as a digital memory. When information recorded in the optical disk is to be reproduced, usually a linearly polarized light generated by a semiconductor laser is irradiated on a recording medium. After the linearly polarized light is reflected off the recording medium, an amount of rotation of a polarization plane thereof is detected by an analyzer and converted into light intensity.

The principles of a reproducing method as described above, wherein the so-called Kerr effect is used, are described hereinbelow.

When the linearly polarized light generated by the semiconductor laser is reflected off the recording medium, the polarization plane thereof is rotated to the right or the left corresponding to a differing perpendicular magnetization direction of the recording medium. A reflected light $R_{11}$ (shown in FIG. 8) that is reflected off the recording medium includes binary information recorded in the recording medium by transposing the binary information into a rotational direction of the polarization plane. The reflected light $R_{11}$ is directed to an analyzer 31 and is split into a detected light $D_{11}$ and a detected light $D_{12}$ in the analyzer 31 according to a difference in the rotational direction of the polarization plane of the light $R_{11}$. A photodetector 32 and a photodetector 33 convert the detected light $D_{11}$ and the detected light $D_{12}$ respectively into electric signals, thereby generating a reproduced signal $S_{11}$ and a reproduced signal $S_{12}$ respectively.

Suppose that a specified perpendicular magnetization direction of the recording medium is designated by (+) and an opposite perpendicular magnetization direction thereof is designated by (−). Also, suppose that $\gamma$ is an incident light vector, $\alpha$ is a reflected light vector reflected off a recorded bit magnetized in the (+) direction, and $\beta$ is a reflected light vector reflected off a recorded bit magnetized in the (−) direction. As shown in FIG. 9, if the polarization plane of the reflected light vector $\alpha$ rotates, for example, by Kerr rotative angle $+\theta_k$ with respect to the incident light vector $\gamma$, the polarization plane of the reflected light vector $\beta$ will on the contrary rotate by Kerr rotative angle $-\theta_k$ with respect to the incident light vector $\gamma$.

Since a polarization direction X and a polarization direction Y of the analyzer 31 are mutually orthogonal, intensities of the reflected light vector $\alpha$ and the reflected light vector $\beta$ are respectively split into X components and Y components thereof and are then detected. The photodetector 32 generates the reproduced signal $S_{11}$. Here, a high level of the reproduced signal $S_{11}$ corresponds to an X component $\beta_x$ of the reflected light vector $\beta$ and a low level of the reproduced signal $S_{11}$ corresponds to an X component $\alpha_x$ of the reflected light vector $\alpha$. That is, the high level of the reproduced signal $S_{11}$ corresponds to the recorded bit magnetized in the (−) direction.

On the other hand, when the reproduced signal $S_{11}$ is at the low level corresponding to the X component $\alpha_x$ of the reflected light vector $\alpha$, the photodetector 33 generates the reproduced signal $S_{12}$ that is at a high level corresponding to a Y component $\alpha_y$ of the reflected light vector $\alpha$. Further, when the reproduced signal $S_{11}$ is at the high level corresponding to the X component $\beta_x$ of the reflected light vector $\beta$, the photodetector 33 generates the reproduced signal $S_{12}$ that is at a low level corresponding to a Y component $\beta_y$ of the reflected light vector $\beta$. The high level of the reproduced signal $S_{12}$ corresponds to the recorded bit magnetized in the (+) direction.

As described above, the high level of the reproduced signal $S_{11}$ generated by the photodetector 32 corresponds to the recorded bit magnetized in the (−) direction and the high level of the reproduced signal $S_{12}$ generated by the photodetector 33 corresponds to the recorded bit magnetized in the (+) direction. The reproduced signal $S_{11}$ and the reproduced signal $S_{12}$ have a phase difference of half a cycle, and vary inversely with respect to each other. Furthermore, the reproduced signal $S_{11}$ and the reproduced signal $S_{12}$ achieved in this way largely exclude disk noise since they are not affected by dust particles or the like attached to the disk surface. This is because the reproduced signal $S_{11}$ and the reproduced signal $S_{12}$ are based on the rotation of the polarization plane of each reflected light. Moreover, the SN ratio may be further improved by supplying the reproduced signal $S_{11}$ and the reproduced signal $S_{12}$ to a differential amplifier and performing information reproduction based on an output signal of the differential amplifier.

However, the reproduction method based on the Kerr effect described above and normally used for performing magneto-optical recordings has a problem in that a high degree of accuracy is necessary for setting the analyzer 31. The method has a further disadvantage of causing a rise in cost of the reproducing device.

A method of reducing the cost of the reproducing device by not using an analyzer and thereby simplifying the reproducing optical device has already been developed theoretically. This method uses the so-called circular dichroism effect. The circular dichroism effect is a phenomenon whereby the intensity and the phase of a circularly polarized light irradiated on a recording medium and reflected therefrom exhibit anisotropy corresponding to the differing perpendicular magnetization directions of the recording medium.

As shown in FIG. 10, suppose that $n_0$ is the refractive index of a medium on an irradiated face of a recording medium 34, $n_+$ is the refractive index of a recorded bit 34a wherein a magnetization direction is directed upwards with respect to the recording medium 34, $r_+$ is the complex reflectance of the recorded bit 34a, $n_-$ is the refractive index of a recorded bit 34b wherein a magnetization direction is directed downwards with respect to the recording medium 34 and $r_-$ is the complex reflectance of the recorded bit 34b. For example, suppose that there is a right circularly polarized light $L_{11}$ irradiated on the recording medium 34 and that an electric field vector of the right circularly polarized light $L_{11}$ rotates clockwise facing a light source. A reflected light from the recorded bit 34a becomes a left circularly polarized light $L_{12}$ and a reflected light from the recorded bit 34b becomes a left circularly polarized light $L_{13}$ having a weaker intensity than the intensity of the left circularly polarized light $L_{12}$. A difference in reflected light intensity between the recorded bit 34a and the recorded bit 34b may be expressed by the following formula (1).

$$(r_+)^2 - (r_-)^2 \qquad (1)$$

(If a left circularly polarized light is irradiated on the recording medium 34, the reflected light becomes a right circularly polarized light and the above relationship between the reflected light intensities corresponding to the recorded bit 34a and the recorded bit 34b is reversed). Further, $r_+$ and $r_-$ may be expressed in terms of $n_0$, $n_+$ and $n_-$ as follows.

$$r_+ = (n_0 - n_+)/(n_0 + n_+) \qquad (2)$$

$$r_- = (n_0 - n_-)/(n_0 + n_-) \qquad (3)$$

However, in a reproduction method using the circular dichroism effect, noise gets included in the reproduced signal since an attempt is made to detect the magnetization direction of the recording medium by transposing it into a difference in reflected light intensity. This is because foreign matter such as dust particles that adhere to the surface of the optical disk affect the reflected light intensity. As a result, there is a greater tendency for signal quality to deteriorate when a reproduction method using the circular dichroism effect is employed than when a conventional reproduction method using the Kerr effect is employed.

SUMMARY OF THE INVENTION

It is an object of the present invention to provide a reproducing optical device for a magneto-optical recording medium that achieves a superior quality reproduced signal using a simple optical system, by employing a configuration wherein information is reproduced from a magneto-optical recording medium using the circular dichroism effect and not the Kerr effect, and wherein the reproduced signal is differentially amplified.

In order to attain the above object, a reproducing optical device for a magneto-optical recording medium related to the present invention is provided at least with each of the following means.

(a) light source means for simultaneously emitting linearly polarized lights having polarization directions which are mutually orthogonal towards a magneto-optical recording medium (for example, a semiconductor laser; here, the recording medium is magnetized corresponding to recorded information in a first direction perpendicular with respect to a medium surface and in a second direction that is a reverse direction with respect to the first direction);

(b) quarter wavelength plate, provided between the recording medium and the light source means, for converting one of the linearly polarized lights into right circularly polarized light and the other of the linearly polarized light into left circularly polarized light;

(c) first photodetector means for generating a first reproduced signal corresponding to a variation in intensity of a first reflected light due to the circular dichroism effect, i.e., strong intensity corresponding to the first direction and weak intensity corresponding to the second direction, the first reflected light being a reflected light of the right circularly polarized light off the recording medium; and (d) second photodetector means for generating a second reproduced signal corresponding to a variation in intensity of a second reflected light due to the circular dichroism effect, i.e., weak intensity corresponding to the first direction and strong intensity corresponding to the second direction, the second reflected light being a reflected light of the left circularly polarized light off the recording medium.

According to the above arrangement, one of the linearly polarized lights emitted by the light source means is converted into the right circularly polarized light through the quarter wavelength plate and irradiated on the magneto-optical recording medium. The other of the linearly polarized lights simultaneously emitted by the light source means is converted into the left circularly polarized light according to the quarter wavelength plate and irradiated on the magneto-optical recording medium.

When the right circularly polarized light is irradiated on a first magnetized section that is magnetized in a perpendicularly downward direction with respect to the surface of the magneto-optical recording medium, an intensity of the first reflected light greatly decreases. This is because the magneto-optical recording medium made of, for example, a thin rare-earth transition metal alloy film has the property of circular dichroism. On the other hand, when the left circularly polarized light is irradiated on the first magnetized section, an intensity of the second reflected light decreases only slightly. Further, when the right circularly polarized light is irradiated on a second magnetized section that is magnetized in a perpendicularly upward direction, the intensity of the first reflected light decreases only slightly. On the other hand, when the left circularly polarized light is irradiated on the second magnetized section, the intensity of the second reflected light greatly decreases.

As a result, when the right circularly polarized light and the left circularly polarized light are respectively irradiated on the magneto-optical recording medium, a phase difference of half a cycle develops between them and they vary inversely with respect to each other. The first photodetector means and the second photodetector means detect the first reflected light and the second reflected light respectively and generate the first reproduced signal and the second reproduced signal respectively. The first reproduced signal and the second reproduced signal have a phase difference of half a cycle and vary inversely with respect to each other. Consequently, if the first reproduced signal and the second reproduced signal are differentially amplified, a reproduced signal that varies in response to the magnetization direction of the recording medium and that has an improved SN ratio is thereby achieved.

In order to attain the above object, another reproducing optical system for a magneto-optical recording medium related to the present invention is provided at least with each of the following means.

(a) first light source means (for example, a semiconductor laser) for emitting a first linearly polarized light;

(b) second light source means (for example, a semiconductor laser) for emitting a second linearly polarized light, a polarization direction of the second linearly polarized light being mutually orthogonal to a polarization direction of the first linearly polarized light;

(c) switching means (for example, a high frequency amplifier) for alternately switching an emission of the first light source means and an emission of the second light source means;

(d) quarter wavelength plate means, disposed between the magneto-optical recording medium and both the first light source means and the second light source means, for converting one of the linearly polarized lights into a right circularly polarized light and the other of the linearly polarized lights into a left circularly polarized light;

(e) first reproduced signal generating means (for example, photodetector means and a high frequency amplifier) for generating a first reproduced signal synchronous to the emission of the first light source means and corresponding to a variation in intensity of a first reflected light due to the circular dichroism effect, i.e., strong intensity corresponding to a first direction perpendicular with respect to a medium surface and weak intensity corresponding to a second direction that is a reverse direction with respect to the first direction, the first reflected light being a reflected light of the right circularly polarized light from the recording medium; and (f) second reproduced signal generating means (for example, photodetector means and a high frequency amplifier) for generating a second reproduced signal synchronous to the emission of the second light source means and corresponding to a variation in intensity of a second reflected light due to the circular dichroism effect, i.e., weak intensity corresponding to the first direction and strong intensity corresponding to the second direction, the second reflected light being a reflected light of the left circularly polarized light from the recording medium.

According to the above arrangement, the first linearly polarized light emitted by the first light source means is irradiated on the magneto-optical recording medium after being converted as described earlier into (for example) the right circularly polarized light by the quarter wavelength plate. The second linearly polarized light is emitted by the second light source means when the first light source means is OFF according to the switching operation of the switching means. The first linearly polarized light and the second linearly polarized light are thereby emitted alternately by the respective light source means. The second linearly polarized light is irradiated on the magneto-optical recording medium after being converted into (for example) the left circularly polarized light by the quarter wavelength plate.

As described above, when the right circularly polarized light is irradiated on the first magnetized section, the first reflected light thereof greatly decreases. When the right circularly polarized light is irradiated on the second magnetized section, the first reflected light intensity thereof decreases only slightly. The first reproduced signal generating means generates the first reproduced signal synchronous to the emission of the first light source means. The emission of the first light source means is repeatedly turned ON-OFF according to the operation of the switching means. If levels of the first reproduced signal are averaged (or integrated) over each magnetized section, then the first reproduced signal falls to a low level corresponding to the first magnetized section and rises to a high level corresponding to the second magnetized section. On the other hand, the second reproduced signal, also averaged (or integrated) over each magnetized section, rises to a high level corresponding to the first magnetized section and falls to a low level corresponding to the second magnetized section.

Consequently, if a configuration is employed whereby an integrated signal of the first reproduced signal and an integrated signal of the second reproduced signal are differentially amplified, a reproduced signal that varies corresponding to the magnetization direction of the recording medium is achieved. The SN ratio is thereby improved.

As described above, the SN ratio of the reproduced signal can be raised to a utility level by differentially amplifying the reproduced signals and thereby cancelling any noise (due to dust particles etc.) that is included in the reproduced signals based on the respective reflected light intensities.

For a fuller understanding of the nature and advantages of the invention, reference should be made to the ensuing detailed description taken in conjunction with the accompanying drawings.

BRIEF DESCRIPTION OF THE DRAWINGS

FIG. 1 is an explanatory view showing essential parts of a reproducing optical device for a magneto-optical recording medium.

FIG. 2 is an explanatory view showing the relationship between polarization directions of linearly polarized lights incident on a quarter wavelength plate.

FIG. 3 is an explanatory view showing waveforms of reproduced signals corresponding to magnetization directions of a recording medium.

FIGS. 5 and 6(a)–6(k) show another embodiment of the present invention.

FIG. 5 is an explanatory view showing essential parts of a reproducing optical device for a magneto-optical recording medium.

FIGS. 6(a)–6(k) are timing charts of each signal corresponding to magnetization directions of a recording medium.

FIG. 6(a), (b) are explanatory views showing the correspondence between recorded bits and perpendicular magnetization directions.

FIG. 6(c) is an explanatory view showing a waveform of a clock pulse.

FIG. 6(d), (e) are explanatory views showing waveforms of high frequency signals.

FIG. 6(f) is an explanatory view showing a waveform of reflected light intensity.

FIG. 6(g), (h) are explanatory views showing waveforms of reproduced signals.

FIG. 6(i), (j) are explanatory views showing waveforms of integrated reproduced signals.

FIG. 6(k) is an explanatory view showing a waveform of a differentially amplified reproduced signal.

FIG. 8 is an explanatory view showing essential parts of a reproducing optical device for a magneto-optical recording medium.

FIG. 9 is an explanatory view showing a variation in intensity of reproduced signals due to the Kerr effect.

FIG. 10 is an explanatory view showing the circular dichroism effect of the magneto-optical recording medium.

DESCRIPTION OF THE EMBODIMENTS

One embodiment of the present invention is described hereinbelow, referring to FIGS. 1 to 3.

Figure 1:
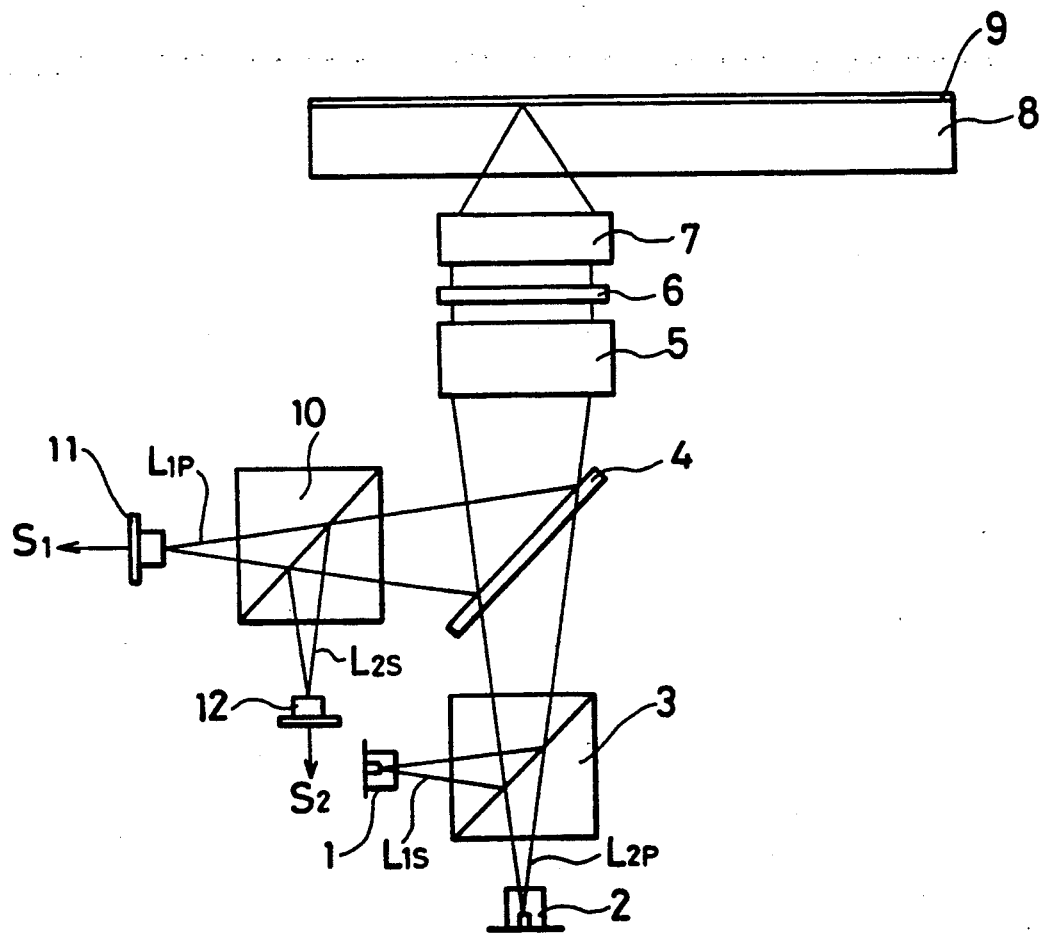
FIGS. 1 to 3 show one embodiment of the present invention.

As shown schematically in FIG. 1, a reproducing optical device of the present invention has a semiconductor laser 1 as first light source means, a semiconductor laser 2 as second light source means, a polarization beam splitter 3, a half-mirror 4, a collimator lens 5, a quarter wavelength plate 6, a convex lens 7, a wavelength filter 10 as splitting means, a photodetector 11 as first photodetector means, and a photodetector 12 as second photodetector means. The semiconductor laser 1 generates a linearly polarized light whose electric field vector is perpendicular to a plane of incidence (the linearly polarized light is hereafter abbreviated as S polarized light). The semiconductor laser 2 generates a linearly polarized light having a different wavelength from that of the S polarized light and whose electric field vector of the P polarized light is parallel to the plane of incidence (the linearly polarized light is hereafter abbreviated as P polarized light). The polarization direction of the S polarized light and the polarization direction of the P polarized light are mutually orthogonal. The polarization beam splitter 3 completely reflects the S polarized light component of the light incident thereon and completely transmits the P polarized light component of the light incident thereon. The collimator lens 5 collimates the light incident thereon into a parallel pencil of light rays. The quarter wavelength plate 6 converts the linearly polarized light into circularly polarized light and vice versa (a prerequisite for using the quarter wavelength plate 6 is that a difference between a length of an optical path of the S polarized light component and a length of an optical path of the P polarized light component be within a range of a quarter wavelength ±20%). The wavelength filter 10 splits the light incident thereon according to a difference in wavelength, since the wavelength filter 10 transmits light of a specified wavelength only. In the case of the present embodiment, the wavelength filter 10 transmits light of a wavelength corresponding to the wavelength of the emission of the semiconductor laser 1.

If, for example, the semiconductor laser 1 emits a linearly polarized light $L_{1s}$ as the S polarized light towards the polarization beam splitter 3, the linearly polarized light $L_{1s}$ is completely reflected from the polarization beam splitter 3 towards an optical disk 8. On the other hand, if the semiconductor laser 2 emits a linearly polarized light $L_{2p}$ as the P polarized light towards the polarization beam splitter 3, the linearly polarized light $L_{2p}$ is completely transmitted by the polarization beam splitter 3 and proceeds towards the optical disk 8 (consequently, both the linearly polarized light $L_{1s}$ and the linearly polarized light $L_{2p}$ proceed towards the optical disk 8 simultaneously).

Figure 2:
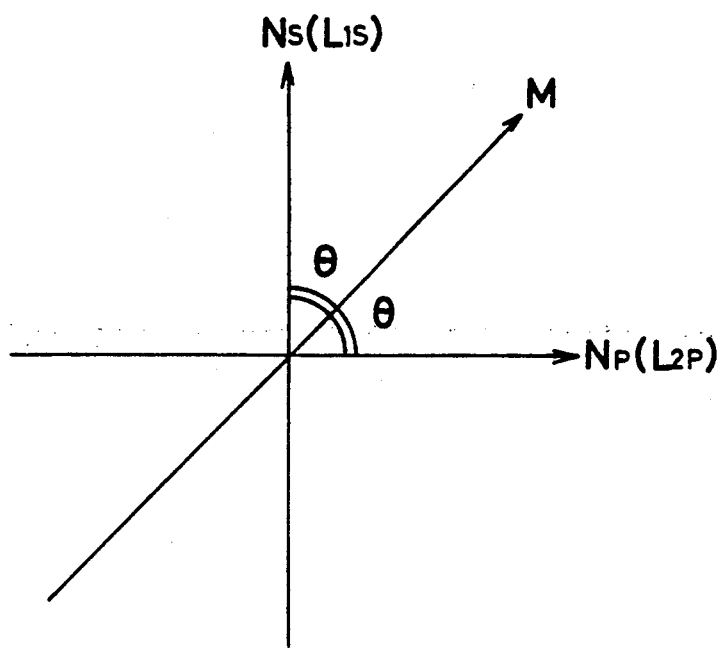
Figure 3:
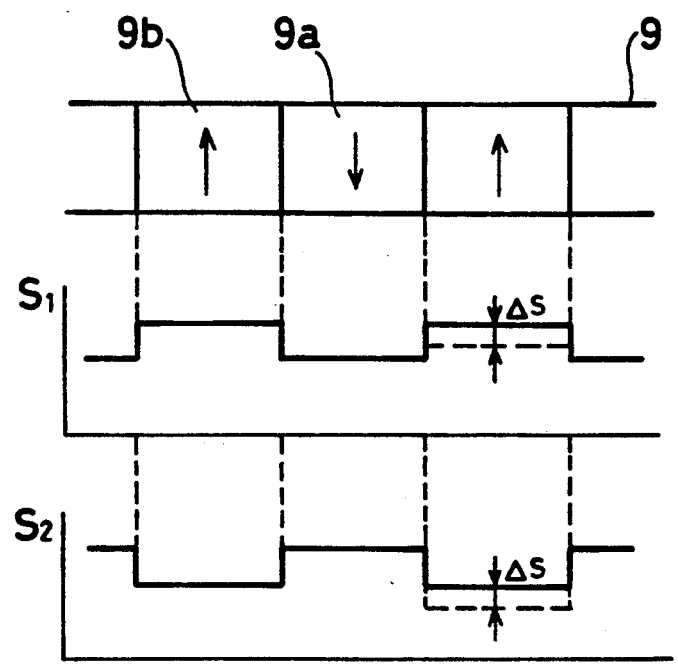

As shown in FIG. 2, the configuration of the quarter wavelength plate 6 is such that a polarization direction $N_s$ of the linearly polarized light $L_{1s}$ incident on the quarter wavelength plate 6 rotates anti-clockwise to an angle of $\theta = 45°$ with respect to a main axis M of the quarter wavelength plate 6. Further, a polarization direction $N_p$ of the linearly polarized light $L_{2p}$ incident on the quarter wavelength plate 6 rotates clockwise to an angle of $\theta = 45°$ with respect to the main axis M of the quarter wavelength plate 6. A phase of the main axis M direction component of an electric field vector of the light that is incident on the quarter wavelength plate 6 is delayed by a quarter wavelength. Consequently, the linearly polarized light $L_{1s}$ changes to the right circularly polarized light, since a phase of the main axis M direction component of an electric field vector of the linearly polarized light $L_{1s}$ is delayed by a quarter wavelength when the linearly polarized light $L_{1s}$ passes through the quarter wavelength plate 6. On the other hand, the linearly polarized light $L_{2p}$ changes to a left circularly polarized light when the linearly polarized light $L_{2p}$ passes through the quarter wavelength plate 6.

As shown in FIG. 1, an optical axis of the convex lens 7 is perpendicular with respect to a surface of a recording medium 9 provided on the optical disk 8. The recording medium 9 is made of, for example, a thin rare-earth transition metal alloy film and information is recorded according to a difference in magnetization direction, the magnetization direction thereof being perpendicular with respect to a surface of the recording medium 9. As shown in FIG. 3, a magnetized section $9a$ is a section that is magnetized in a perpendicularly downward direction with respect to the surface of the recording medium 9, and a magnetized section $9b$ is a section that is magnetized in a perpendicularly upward direction with respect to the surface of the recording medium 9.

Figure 10:
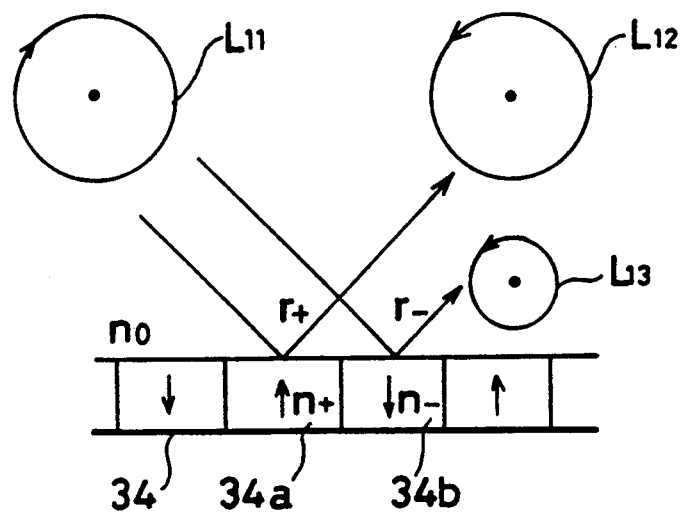

With the above arrangement, the linearly polarized light $L_{1s}$ emitted by the semiconductor laser 1 is completely reflected from the polarization beam splitter 3 in the direction of the optical axis of the convex lens 7. This is because the linearly polarized light $L_{1s}$ serves as an S polarized light with respect to the polarization beam splitter 3. The linearly polarized light $L_{1s}$ then is transmitted by the half mirror 4 and is collimated into the parallel pencil of light rays in the collimator lens 5. Thereafter, the linearly polarized light $L_{1s}$ changes to a right circularly polarized light through the quarter wavelength plate 6, as described earlier. The right circularly polarized light is converged by the convex lens 7 and irradiated so as to form a beam spot on the recording medium 9 of the optical disk 8. The right circularly polarized light is reflected off the recording medium 9 as left circularly polarized light, as shown in the conventional example (FIG. 10). Then, the reflected left circularly polarized light becomes a parallel pencil of light rays after passing through the convex lens 7 and returns to the quarter wavelength plate 6 once again as a right circularly polarized light. The right circularly polarized light that passes through the quarter wavelength plate 6 becomes a linearly polarized light $L_{1p}$ as a P polarized light. This happens because a phase of the main axis M direction component of an electric field vector of the right circularly polarized light is delayed by a quarter wavelength. After passing through the collimator lens 5, the linearly polarized light $L_{1p}$ is reflected towards the wavelength filter 10 by the half mirror 4. Then, after being completely transmitted by the wavelength filter 10, the linearly polarized light $L_{1p}$ is detected by the photodetector 11.

On the other hand, the linearly polarized light $L_{2p}$ that is emitted by the semiconductor laser 2 is completely transmitted by the polarization beam splitter 3 since it is a P polarized light (the wavelength of the linearly polarized light $L_{2p}$ differs from the wavelength of the linearly polarized light $L_{1s}$ emitted by the semiconductor laser 1). Then, the linearly polarized light $L_{2p}$ changes to a left circularly polarized light according to the quarter wavelength plate 6 after being transmitted by the half mirror 4 and the collimator lens 5 in the same way as described for the linearly polarized light $L_{1s}$. The left circularly polarized light that is irradiated on the recording medium 9 after passing through the convex lens 7 is reflected by the recording medium 9 as a right circularly polarized light and then passes through the convex lens 7 and returns to the quarter wavelength plate 6 as a left circularly polarized light. The left circularly polarized light that passes through the quarter wavelength plate 6 becomes a linearly polarized light $L_{2s}$ as an S polarized light. After passing through the collimator lens 5, the linearly polarized light $L_{2s}$ is reflected towards the wavelength filter 10 by the half mirror 4. Then, after being completely reflected from the wavelength filter 10, the linearly polarized light $L_{2s}$ is detected by the photodetector 12.

Further, the present embodiment has been shown to have a configuration wherein the wavelength filter 10 receives the respective linearly polarized light converted by the quarter wavelength plate 6 from the right circularly polarized light and the left circularly polarized light reflected off the recording medium 9. However, it may equally be arranged so that the wavelength filter 10 directly receives the right circularly polarized light and the left circularly polarized light reflected off the recording medium 9 without conversion into the respective linearly polarized light.

A variation of a reproduced signal $S_1$ generated by the photodetector 11 corresponds to a variation in light intensity of the linearly polarized light $L_{1p}$ that occurs when the linearly polarized light $L_{1p}$ is reflected off the recording medium 9. A reflected light intensity of the right circularly polarized light irradiated on the magnetized section 9a (having a perpendicularly downward magnetization direction) of the recording medium 9 decreases greatly due to the circular dichroism effect, as shown in the conventional example (FIG. 10). Consequently, as shown in FIG. 3, a low level of the reproduced signal $S_1$ corresponds to the magnetized section 9a and a high level of the reproduced signal $S_1$ corresponds to the magnetized section 9b (having a perpendicularly upward magnetization direction).

On the other hand, a variation of a reproduced signal $S_2$ generated by the photodetector 12 corresponds to a variation in light intensity of the linearly polarized light $L_{2s}$ that occurs when the linearly polarized light $L_{2s}$ is reflected off the recording medium 9. A reflected light intensity of the left circularly polarized light decreases greatly when it is irradiated on the magnetized section 9b, rather than the magnetized section 9a as happens in the case of the right circularly polarized light. Consequently, a low level of the reproduced signal $S_2$ corresponds to the magnetized section 9b and a high level of the reproduced signal $S_2$ corresponds to the magnetized section 9a.

As a result, the reproduced signal $S_1$ corresponding to the magnetized section 9a and the magnetized section 9b varies inversely with respect to the reproduced signal $S_2$ corresponding to the magnetized section 9a and the magnetized section 9b. Consequently, the reproduced signal $S_1$ and the reproduced signal $S_2$ may be differentially amplified and thereby a reproduced signal that has an acceptable SN ratio may be generated by a differential amplifier. Furthermore, suppose that, for example, the reproduced signal $S_1$ decreases from an original value by $\Delta S$ (FIG. 3) due to the effect of foreign matter such as dust particles adhering to the surface of the optical disk 8 and affecting reflected light intensity thereof. Here, the reproduced signal $S_2$ also decreases by $\Delta S$ due to the same foreign matter, since the semiconductor laser 1 and the semiconductor laser 2 irradiate the recording medium 9 simultaneously. Consequently, $\Delta S$ can be cancelled by differentially amplifying the reproduced signal $S_1$ and the reproduced signal $S_2$. Disk noise extraneous to the reproduced signal of recorded information can thereby be reduced.

Another embodiment of the present invention is described hereinbelow, referring to FIG. 4. For the sake of convenience, members having the same function as in the aforementioned embodiment will be designated by the same code and their description will be omitted.

The aforementioned embodiment showed a case wherein the two lights reflected off the recording medium 9 are split according to the wavelength filter 10 utilizing a difference in wavelength thereof. The present embodiment shows a case wherein the two lights are split according to a polarization beam splitter 3 utilizing a difference in polarization direction thereof.

Figure 4:
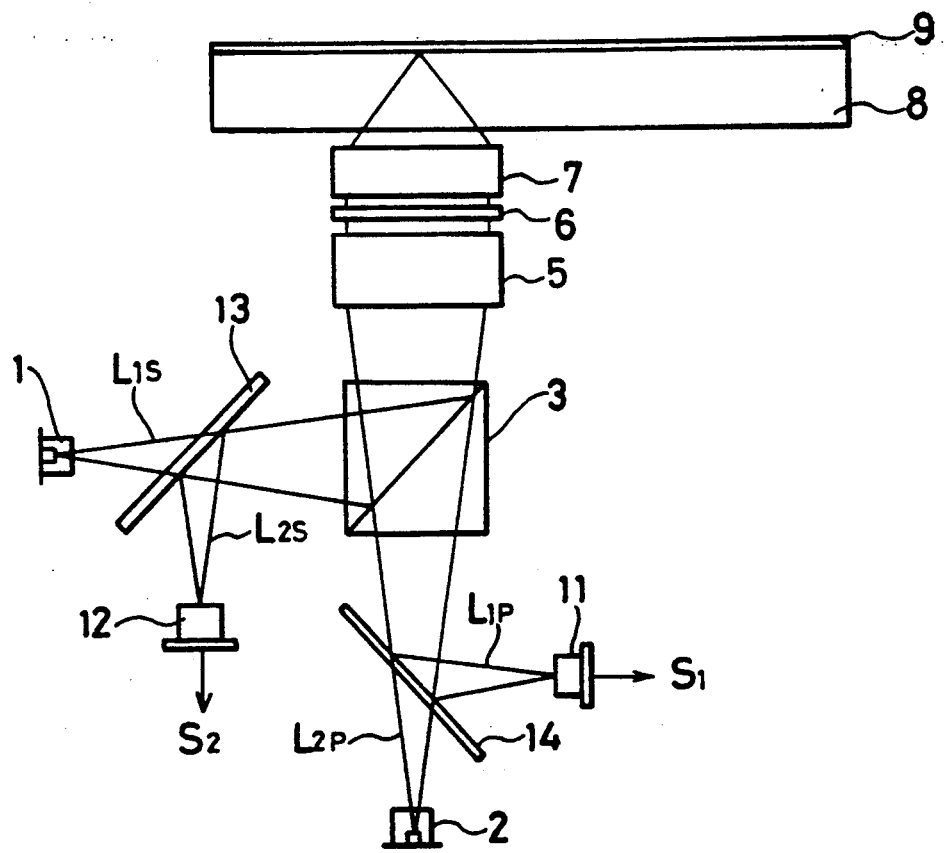
FIG. 4 shows another embodiment of the present invention and is an explanatory view showing essential parts of a reproducing optical device for a magneto-optical recording medium.

As shown in FIG. 4, a reproducing optical device according to the present embodiment is provided with a half mirror 13 installed between a semiconductor laser 1 and the polarization beam splitter 3, and a half mirror 14 installed between a semiconductor laser 2 and the polarization beam splitter 3. In the same way as shown in FIG. 3, a collimator lens 5, a quarter wavelength plate 6 and an optical disk 8 comprising a recording medium 9 are provided in line with the optical axis of a convex lens 7. Further, as will be described later, after each light that is reflected off the recording medium 9 is split by the polarization beam splitter 3, one light is reflected so as to be directed towards a photodetector 12 by the half mirror 13 and another light is reflected simultaneously so as to be directed towards a photodetector 11 by the half mirror 14.

With the above arrangement, a linearly polarized light $L_{1s}$ emitted by the semiconductor laser 1 is transmitted by the half mirror 13 and is completely reflected from the polarization beam splitter 3. Then, after successively passing through the collimator lens 5, the quarter wavelength plate 6 and the convex lens 7, the linearly polarized light $L_{1s}$ is irradiated on the recording medium 9 of the optical disk 8 as a right circularly polarized light. This happens because the linearly polarized light $L_{1s}$ is an S polarized light. As in the previous embodiment, a light reflected off the recording medium 9 passes through the quarter wavelength plate 6 and becomes a linearly polarized light $L_{1p}$, as a P polarized light. Since it is a P polarized light, the linearly polarized light $L_{1p}$ is completely transmitted by the polarization beam splitter 3. Then, the linearly polarized light $L_{1p}$ is completely reflected from the half mirror 14 and is directed to the photodetector 11.

As in the previous embodiment, a linearly polarized light $L_{2p}$ as a P polarized light emitted by the semiconductor laser 2 also changes to a linearly polarized light $L_{2s}$ as an S polarized light after passing through the quarter wavelength plate 6 and returns to the polarization beam splitter 3. Consequently, the $L_{2s}$ is completely reflected successively by the polarization beam splitter 3 and the half mirror 13 and is directed to the photodetector 12.

Here, an explanation of a reproduced signal achieved by differential amplification of a reproduced signal $S_1$ generated by the photodetector 11 and a reproduced signal $S_2$ generated by the photodetector 12 is the same as that for the previous embodiment and is thereby omitted.

As described earlier, in a case where a right circularly polarized light and a left circularly polarized light are simultaneously directed towards the recording medium, a reflected light intensity of the right circularly polarized light varies inversely with respect to a reflected light intensity of the left circularly polarized light due to the circular dichroism effect. Consequently, disk noise can be cancelled by differentially amplifying each reproduced signal generated by the photodetector means based on each reflected light intensity. The reproducing optical device related to the present invention presents a further advantage in that the SN ratio of the reproduced signal may be raised to a utility level according to a simple optical system thereby obviating the use of an expensive conventional analyzer.

Another embodiment of the present invention is described hereinbelow, referring to FIGS. 5 to 7. For the sake of convenience, members having the same function as in the aforementioned embodiment will be designated by the same code and their description will be omitted.

Figure 5:
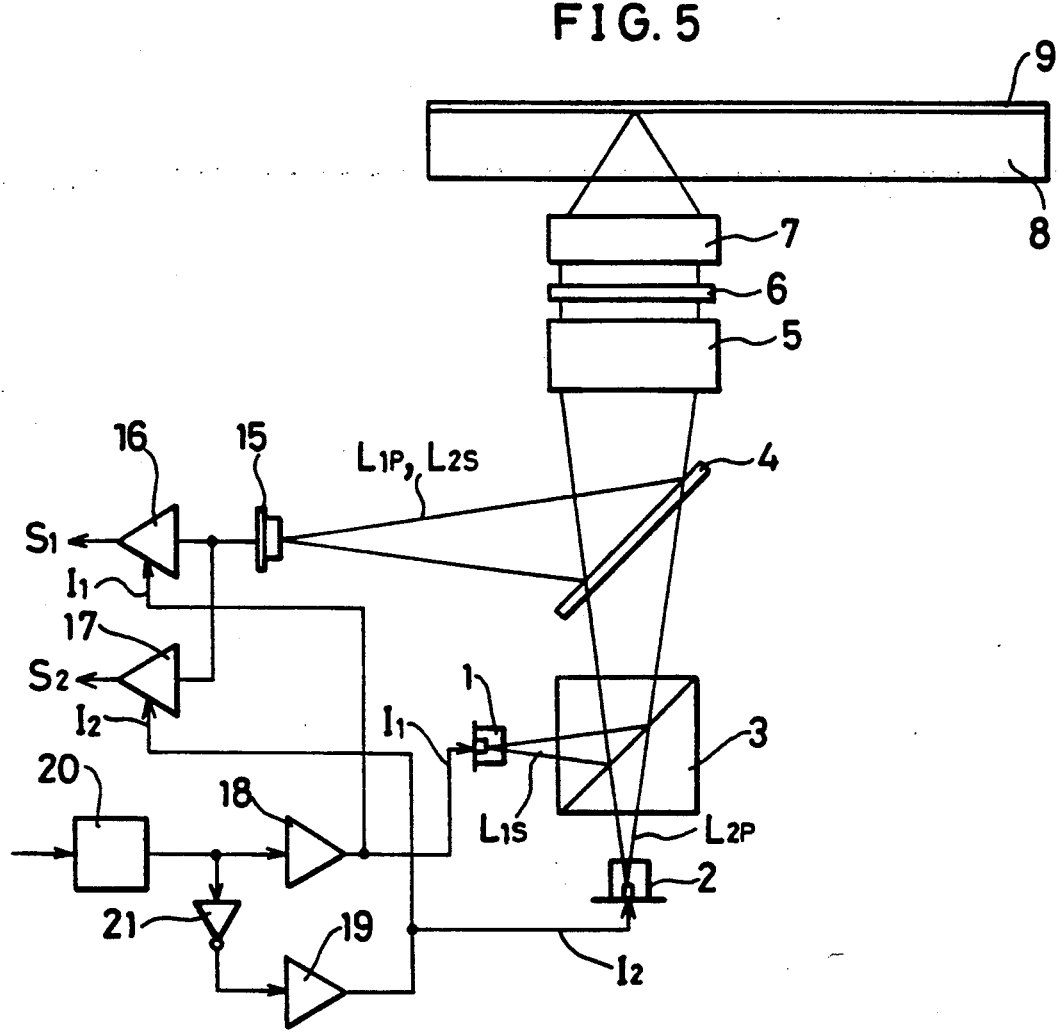

As shown schematically in FIG. 5, the reproducing optical device of the present invention essentially comprises parts common to the configuration shown in FIG. 1, i.e., a semiconductor laser 1 and a semiconductor laser 2, a polarization beam splitter 3, a half mirror 4, a collimator lens 5, a quarter wavelength plate 6 and a convex lens 7; and, apart from these, a photodetector 15, high frequency amplifiers 16, 17, 18, 19, an oscillator 20 and an invertor 21.

The high frequency amplifier 18 superposes a high frequency signal $I_1$ on a laser driving current and causes a laser light in the semiconductor laser 1 to oscillate in the multi-longitudinal mode in order to reduce laser noise that is caused when a light returns from an optical disk 8 to the semiconductor laser 1. Similarly, the high frequency amplifier 19 superposes a high frequency signal $I_2$ on a laser driving current and causes a laser light in the semiconductor laser 2 to oscillate in the multi-longitudinal mode. The high frequency amplifier 18 and the high frequency amplifier 19 function as switching means for switching an emission of the semiconductor laser 1 and an emission of the semiconductor laser 2 at high speed since the high frequency signal $I_1$ and the high frequency signal $I_2$ are switched ON/OFF alternately. The high frequency amplifier 16 generates a reproduced signal $S_1$ based on an output of the photodetector 15 when the high frequency signal $I_1$ sent to the high frequency amplifier 16 is at a high level. The high frequency amplifier 17 generates a reproduced signal $S_2$ based on an output of the photodetector 15 when the high frequency signal $I_2$ sent to the high frequency amplifier 17 is at a high level. That is, the high frequency amplifier 16 and the photodetector 15 serve as a first reproduced signal generating means and the high frequency amplifier 17 and the photodetector 15 serve as second reproduced signal generating means. The oscillator 20 generates a clock pulse for the high frequency amplifier 18 and the high frequency amplifier 19. The invertor 21 receives the clock pulse from the oscillator 20 and supplies an inverted clock pulse to the high frequency amplifier 19.

Figure 6A:
Figure 6B:

As shown in FIGS. 6(a) and 6(b), a magnetized section 9b that is magnetized, for example, in a perpendicularly upward direction forms a recorded bit on a recording medium 9 of the optical disk 8 (hereafter, the magnetized section 9b will be referred to as upward magnetized section 9b and a magnetized section 9a will be referred to as downward magnetized section 9a). Further, although in the present embodiment a case is described wherein the photodetector 15 receives each linearly polarized light that has been respectively converted through the quarter wavelength plate 6 from each circularly polarized light reflected off the recording medium 9, the photodetector 15 may equally well receive the respective circularly polarized light reflected off the recording medium 9 directly.

The following description refers to FIG. 5 where necessary. The oscillator 20 receives a high frequency superposition signal and generates a clock pulse, shown by (c) of FIG. 6, to the high frequency amplifier 18 and to the invertor 21. The clock pulse has a frequency of 10–100 MHz, i.e., more than 10 times the normal recorded/reproduced signal frequency. The high frequency amplifier 18 generates the high frequency signal $I_1$ as a driving current for high frequency superposition to the semiconductor laser 1. The high frequency amplifier 18 also generates the high frequency signal $I_1$ as a reference signal to the high frequency amplifier 16. As shown by (d) of FIG. 6, the high frequency signal $I_1$ is synchronized to the clock pulse shown by (c) of FIG. 6. The high frequency amplifier 19 generates the high frequency signal $I_2$ as a driving current for high frequency superposition to the semiconductor laser 2. The high frequency amplifier 19 also generates the high frequency signal $I_2$ as a reference signal to the high frequency amplifier 17. As shown by (e) of FIG. 6, the high frequency signal $I_2$ is synchronized to the inverted clock pulse generated by the invertor 21. In this way, the semiconductor laser 1 and the semiconductor laser 2 are alternately switched ON/OFF. That is, a linearly polarized light $L_{1s}$ and a linearly polarized light $L_{2p}$ are emitted alternately by the semiconductor laser 1 and the semiconductor laser 2 respectively.

With the above arrangement, the linearly polarized light $L_{1s}$ emitted by the semiconductor laser 1 becomes a linearly polarized light $L_{1p}$ and is directed to the photodetector 15. The linearly polarized light $L_{1p}$ is a P polarized light since, as described earlier, the linearly polarized light $L_{1p}$ passes through the quarter wavelength plate 6 twice. Here, reflected light intensity at the upward magnetized section 9b decreases only slightly and reflected light intensity at the downward magnetized section 9a decreases greatly. This is due to the circular dichroism effect.

Similarly, when the semiconductor laser 1 is OFF, the linearly polarized light $L_{2p}$ (the wavelength of the linearly polarized light $L_{2p}$ differs from the wavelength of the linearly polarized light $L_{1s}$ emitted by the semiconductor laser 1) emitted by the semiconductor laser 2 becomes a linearly polarized light $L_{2s}$ and is directed to the photodetector 15. However, the linearly polarized light $L_{2s}$ is in this case an S polarized light since it also passes through the quarter wavelength plate 6 twice. Here, reflected light intensity at the upward magnetized section 9b decreases greatly and reflected light intensity at the downward magnetized section 9a decreases only slightly. This is due to the circular dichroism effect and is the converse of the case where the linearly polarized light $L_{1s}$ is emitted.

A description follows hereinbelow of the variation in intensity of the reflected lights (the linearly polarized light $L_{1p}$ and the linearly polarized light $L_{2s}$) directed to the photodetector 15. In the case when, for example, the semiconductor laser 1 emits the linearly polarized light $L_{1s}$ with respect to the downward magnetized section 9a, the high frequency signal $I_1$ that switches the semiconductor laser 1 to ON is a high frequency signal $I_{1a}$ (shown by (d) of 6). As shown by (f) of FIG. 6, a reflected light intensity $I_{R1a}$ of the linearly polarized light $L_{1p}$ becomes relatively small because of a decreasing action of the downward magnetized section 9a. Here, the linearly polarized light $L_{1p}$ is directed to the photodetector 15 after being reflected off the downward magnetized section 9a. On the other hand, when the semiconductor laser 1 is OFF and the semiconductor laser 2 emits the linearly polarized light $L_{2p}$ with respect to the downward magnetized section 9a, the high frequency signal $I_2$ that switches the semiconductor laser 2 to ON is a high frequency signal $I_{2a}$ (shown by (e) of 6). As shown by (f) of FIG. 6, a reflected light intensity $I_{R2a}$ of the linearly polarized light $L_{2s}$ becomes relatively large for the same reason as given above. Here, the linearly polarized light $L_{2s}$ is directed to the photodetector 15 after being reflected off the downward magnetized section 9a. Comparing (e) and (f) of FIG. 6 makes it clear that a rising edge of a reflected light intensity $I_R$ of a light reflected off the downward magnetized section 9a is synchronous to a rising edge of the high frequency signal $I_2$.

In the case when, for example, the semiconductor laser 1 emits the linearly polarized light $L_{1s}$ with respect to the upward magnetized section 9b, the high frequency signal $I_1$ that switches the semiconductor laser 1 to ON is a high frequency signal $I_{1b}$ (shown by (d) of 6). As shown by (f) of FIG. 6, a reflected light intensity $I_{R1b}$ of the linearly polarized light $L_{1p}$ becomes relatively large. Here, the linearly polarized light $L_{1p}$ is directed to the photodetector 15 after being reflected off the upward magnetized section 9b. On the other hand, when the semiconductor laser 1 is OFF and the semiconductor laser 2 emits the linearly polarized light $L_{2p}$ with respect to the upward magnetized section 9b, the high frequency signal $I_2$ that switches the semiconductor laser 2 to ON is a high frequency signal $I_{2b}$ (shown by (e) of 6). As shown by (f) of FIG. 6, a reflected light intensity $I_{R2b}$ of the linearly polarized light $L_{2s}$ becomes relatively small because of a decreasing action of the upward magnetized section 9b. Here, the linearly polarized light $L_{2s}$ is directed to the photodetector 15 after being reflected off the upward magnetized section 9b. Comparing (d) and (f) of FIG. 6 makes it clear that a rising edge of a reflected light intensity $I_R$ of a light reflected off the upward magnetized section 9b is synchronous to a rising edge of the high frequency signal $I_1$.

As shown by (f) of FIG. 6, the reflected light intensity $I_R$ becomes symmetrical around a vicinity where the upward magnetized section 9a adjoins the downward magnetized section 9b. That is, there is a phase difference of half a cycle between a temporal variation of the reflected light intensity $I_R$ at the upward magnetized section 9b and a temporal variation of the reflected light intensity $I_R$ at the downward magnetized section 9a.

As shown by (g) in FIG. 6, when the high frequency signal $I_{1a}$ that is fed into the high frequency amplifier 16 is at a high level corresponding to the downward magnetized section 9a, a low level reproduced signal $S_{1a}$ is generated by the high frequency amplifier 16. The low level reproduced signal $S_{1a}$ is based on the reflected light intensity $I_{R1a}$ (of the linearly polarized light $L_{1p}$) that is received by the photodetector 15. Furthermore, when the high frequency signal $I_{1b}$ that is fed into the high frequency amplifier 16 is at a high level corresponding to the upward magnetized section 9b, a high level reproduced signal $S_{1b}$ is generated by the high frequency amplifier 16. The high level reproduced signal $S_{1b}$ is based on the reflected light intensity $I_{R1b}$ (of the linearly polarized light $L_{1p}$) that is received by the photodetector 15. Naturally, the reproduced signal $S_1$ becomes 0 when the high frequency signal $I_1$ is OFF.

As shown by (i) in FIG. 6, an integrated reproduced signal $T_1$ is achieved by processing the reproduced signal $S_1$ according to integrating means (not shown) such as an integrating circuit. The integrated reproduced signal $T_1$ is at a high level corresponding with the upward magnetized section 9b and at a low level corresponding with the downward magnetized section 9a.

Similarly, as shown by (h) in FIG. 6, when the high frequency signal $I_{2a}$ that is fed into the high frequency amplifier 17 is at a high level corresponding to the downward magnetized section 9a, a high level reproduced signal $S_{2a}$ is generated by the high frequency amplifier 17. The high level reproduced signal $S_{2a}$ is based on the reflected light intensity $I_{R2a}$ (of the linearly polarized light $L_{2s}$) that is received by the photodetector 15. Furthermore, when the high frequency signal $I_{2b}$ that is fed into the high frequency amplifier 17 is at a high level corresponding to the upward magnetized section 9b, a low level reproduced signal $S_{2b}$ is generated by the high frequency amplifier 17. The low level reproduced signal $S_{2b}$ is based on the reflected light intensity $I_{R2b}$ (of the linearly polarized light $L_{2s}$) that is received by the photodetector 15. Naturally, the reproduced signal $S_2$ becomes 0 when the high frequency signal $I_2$ is OFF.

As shown by (j) in FIG. 6, an integrated reproduced signal $T_2$ is achieved by processing the reproduced signal $S_2$ according to the integrating circuit. The integrated reproduced signal $T_1$ and the integrated reproduced signal $T_2$ vary inversely with respect to each other since there is a phase difference of half a cycle between them. The integrated reproduced signal $T_2$ is thus at a low level in correspondence with the upward magnetized section 9b and at a high level in correspondence with the downward magnetized section 9a.

Consequently, as shown by (k) in FIG. 6, when the integrated reproduced signal $T_1$ and the integrated reproduced signal $T_2$ are differentially amplified, a differentially amplified reproduced signal $\Delta T$ ($=T_1-T_2$) having a utility level SN ratio is obtained. Information recorded in the recording medium 9 is read out as digital data based on a variation in intensity of the reproduced signal $\Delta T$. Further, suppose for example that a signal intensity of the reproduced signal $S_1$ becomes smaller than an original value thereof as a result of foreign matter such as dust particles adhering to the surface of the optical disk 8. In such a case, an intensity of the integrated reproduced signal $T_1$ consequently decreases. However, since a signal intensity of the reproduced signal $S_2$ also decreases as a result of the same foreign matter, an intensity of the integrated reproduced signal $T_2$ decreases by the same amount. As a result, when the integrated reproduced signal $T_1$ and the integrated reproduced signal $T_2$ are differentially amplified, the decrease in intensity of the integrated reproduced signal $T_1$ and the decrease in intensity of the integrated reproduced signal $T_2$ due to the foreign matter are mutually cancelled. Disk noise extraneous to the reproduced signal of recorded information can thereby be reduced.

Another embodiment of the present invention is described hereinbelow, referring to FIG. 7. For the sake of convenience, members having the same function as in the aforementioned embodiment will be designated by the same code and their description will be omitted.

In the preceding embodiment, a case is shown wherein the reproduced signals are based on the two reflected light intensities of the light reflected off the recording medium 9 and the reproduced signals are split according to switching operations of the high frequency amplifier 16 and the high frequency amplifier 17. In the present embodiment, however, a case is shown wherein a polarization beam splitter 3 is used as splitting means. In this case, two reflected lights are split according to a difference in direction of respective polarized lights.

Figure 7:
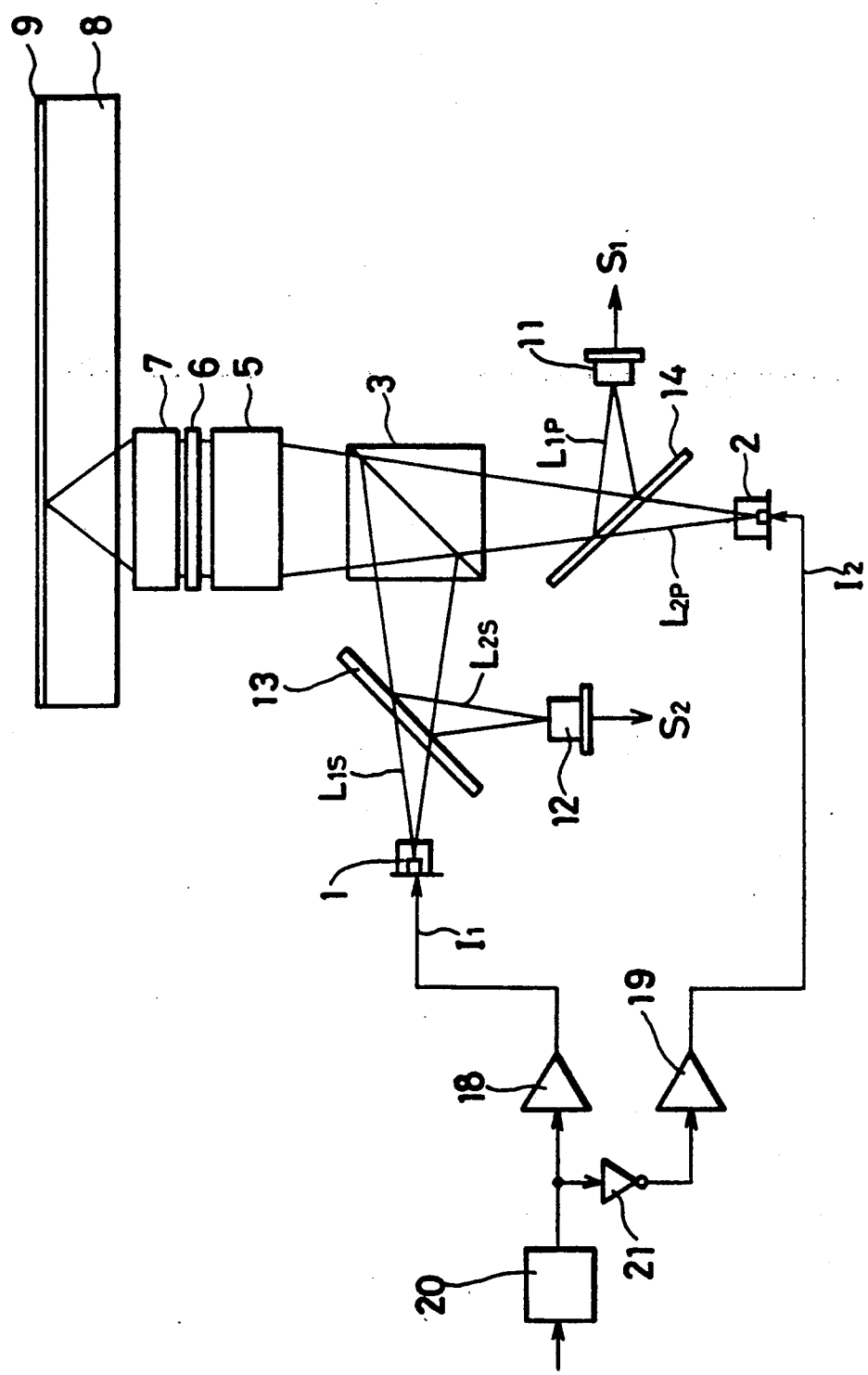
FIG. 7 shows another embodiment of the present invention and is an explanatory view showing essential parts of a reproducing optical device for a magneto-optical recording medium.
Figure 8:
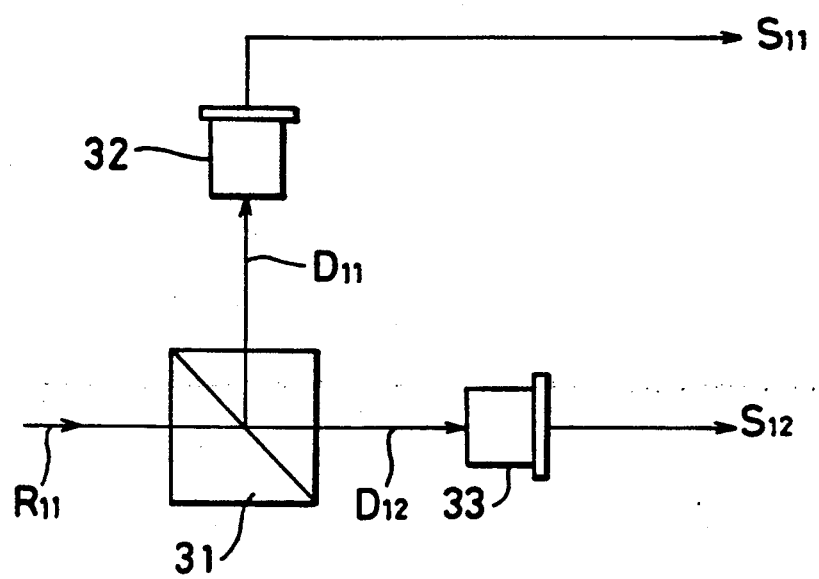
FIGS. 8 to 10 show a conventional example.
Figure 9:
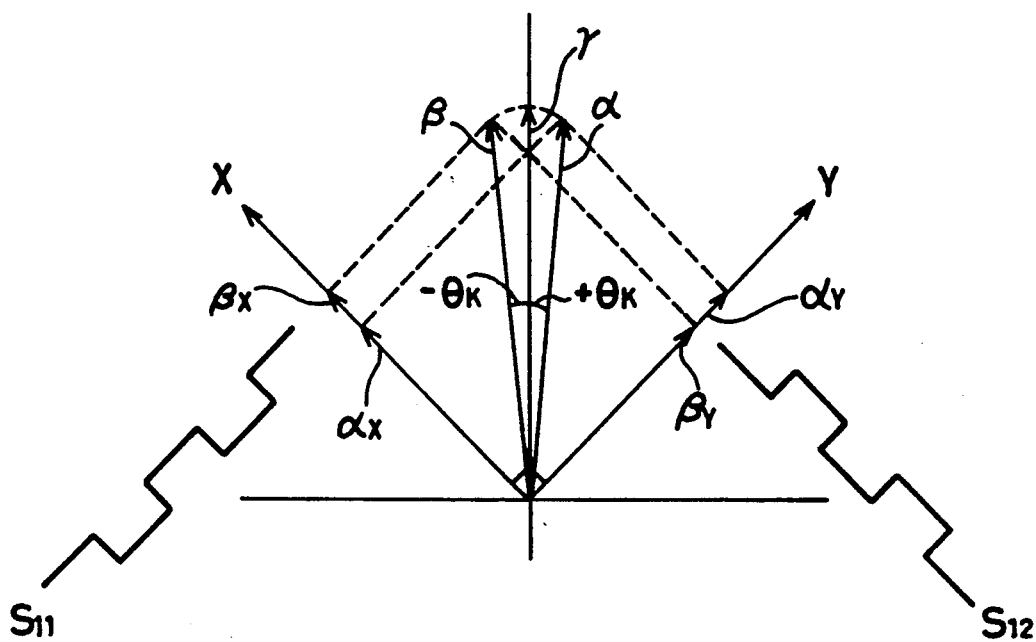

As shown in FIG. 7, a reproducing optical device of the present embodiment, in addition to a configuration as shown in FIG. 4, is provided with a high frequency amplifier 18 that sends a high frequency signal $I_1$ to a semiconductor laser 1, a high frequency amplifier 19 that sends a high frequency signal $I_2$ to a semiconductor laser 2, an oscillator 20 that generates a clock pulse and an invertor 21 that supplies an inverted clock pulse to the high frequency amplifier 19.

With the above arrangement, a linearly polarized light $L_{1s}$ emitted by a semiconductor laser 1 becomes a linearly polarized light $L_{1p}$ as a P polarized light after passing through a quarter wavelength plate 6 twice. As described earlier referring to FIG. 4, the linearly polarized light $L_{1p}$ is directed to a photodetector 11 after being completely transmitted by the polarization beam splitter 3 and then being completely reflected from the half mirror 14. A linearly polarized light $L_{2p}$ emitted by a semiconductor laser 2 returns to the polarization beam splitter 3 as a linearly polarized light $L_{2s}$. The linearly polarized light $L_{2s}$ is an S polarized light. Then, the linearly polarized light $L_{2s}$ is directed to a photodetector 12 after being completely reflected in succession by both the polarization beam splitter 3 and the half mirror 13. In this way a reproduced signal $S_1$ that is generated by the photodetector 11 and a reproduced signal $S_2$ that is generated by the photodetector 12 are split and generated without necessitating the switching operation of the high frequency amplifier 16 and the high frequency amplifier 17 as mentioned earlier.

Further, a rising edge of the reproduced signal $S_1$ is synchronous to a rising edge of the high frequency signal $I_1$. A variation in intensity of the reproduced signal $S_1$ corresponds to a downward magnetized section 9a and an upward magnetized section 9b as has been previously described referring to FIG. 6. Similarly, a rising edge of the reproduced signal $S_2$ is synchronous to a rising edge of the high frequency signal $I_2$. A variation in intensity of the reproduced signal $S_2$ corresponds to the downward magnetized section 9a and the upward magnetized section 9b as has been previously described referring to FIG. 6. An explanation of a reproduced signal $\Delta T$ achieved by differential amplification is as previously noted and is thereby omitted.

As described above, when a right circularly polarized light and a left circularly polarized light are alternately directed on the recording medium, each reflected light intensity thereof varies inversely with respect to other in response to the magnetization direction of the recording medium. This is due to the circular dichroism effect. Accordingly, disk noise can be cancelled by differentially amplifying each reproduced signal based on each reflected light intensity and generated by photodetector means (Further, in the case where the right circularly polarized light and the left circularly polarized light are switched at high speed during irradiation on the recording medium, each signal is first integrated and then differentiated). Consequently, the reproducing optical device for a magneto-optical recording medium related to the present invention has an advantage in that a reproduced signal having a utility level SN ratio may be achieved according to a simple optical system and without necessitating an expensive analyzer.

The invention being thus described, it may be obvious that the same may be varied in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

What is claimed is:

1. A reproducing optical device for a magneto-optical recording medium, comprising:

light source means for simultaneously emitting linearly polarized lights whose polarization directions are mutually orthogonal towards a magneto-optical recording medium, wherein the recording medium is comprised of a plurality of magnetized sections each magnetized in response to recorded information in either a first direction perpendicular to a surface of the recording medium or a second direction that is a reverse direction with respect to the first direction;

quarter wavelength plate means, disposed between the recording medium and the light source means, for converting one of the linearly polarized lights into a right circularly polarized light and the other of the linearly polarized lights into a left circularly polarized light;

means for directing said right circularly polarized light and said left circularly polarized light simultaneously onto one of said magnetized sections;

first photodetector means for generating a first reproduced signal that corresponds to a variation due to circular dichroism such that intensity of a first reflected light is strong corresponding to one of said magnetized sections magnetized in the first direction and is weak corresponding to one of said magnetized sections magnetized in the second direction, the first reflected light being a reflected light of the right circularly polarized light from the recording medium; and second photodetector means for generating a second reproduced signal that corresponds to a variation, due to circular dichroism, between weak intensity of a second reflected light, corresponding to one of said magnetized sections magnetized in the first direction, and strong intensity of the second reflected light, corresponding to one of said magnetized sections magnetized in the second direction, the second reflected light being a reflected light of the left circularly polarized light from the recording medium.

2. A reproducing optical device as set forth in claim 1, further comprising:
splitting means for transmitting one of the first reflected light and the second reflected light and reflecting the other of the first reflected light and the second reflected light, such that the first reflected light is directed to the first photodetector means and the second reflected light is directed to the second photodetector means.

3. A reproducing optical device as set forth in claim 2, wherein the light source means comprises:
first light source means for emitting an S polarized light that is a linearly polarized light whose electric field vector is perpendicular with respect to a plane of incidence of the S polarized light;
second light source means for emitting a P polarized light that is a linearly polarized light whose electric field vector is parallel with respect to the plane of incidence of the P polarized light; and
polarization beam splitter means for completely reflecting the S polarized light emitted by the first light source means towards the recording medium and for completely transmitting the P polarized light emitted by the second light source means towards the recording medium,
wherein the polarization beam splitter means is disposed between the quarter wavelength plate means and both the first light source means and the second light source means.

4. A reproducing optical device as set forth in claim 3, wherein:
the splitting means comprises a wavelength filter for splitting the first reflected light and the second reflected light according to a difference in wavelengths thereof;
the splitting means is disposed between the quarter wavelength plate means and both the first photodetector means and the second photodetector means; and
the wavelength of the S polarized light emitted by the first light source means differs from the wavelength of the P polarized light emitted by the second light source means.

5. A reproducing optical device as set forth in claim 3, wherein:
the quarter wavelength plate means respectively converts the first reflected light and the second reflected light into linearly polarized lights having mutually orthogonal polarization directions; and
the polarization beam splitter means receives the linearly polarized lights converted by the quarter wavelength plate means and splits the path of each of the linearly polarized lights according to a difference in the polarization direction thereof.

6. A reproducing optical device as set forth in claim 3, wherein:
the quarter wavelength plate means is disposed so that the polarization direction of the S polarized light forms an angle of 45° in an anti-clockwise direction with respect to a main axis of the quarter wavelength plate means and so that the polarization direction of the P polarized light forms an angle of 45° in an clockwise direction with respect to the main axis of the quarter wavelength plate means; and
a difference between an optical path length of the S polarized light emitted by the first light source means and an optical path length of the P polarized light emitted by the second light source means has a permissible range of a quarter wavelength ±20%.

7. A reproducing optical device as set forth in claim 1, further comprising means for differentially amplifying the first reproduced signal and the second reproduced signal.

8. A reproducing optical device for a magneto-optical recording medium, comprising:
first light source means for emitting a first linearly polarized light;
second light source means for emitting a second linearly polarized light whose polarization direction is orthogonal to the polarization direction of the first linearly polarized light;
switching means for generating an ON/OFF signal for alternately switching between an emission of the first light source means and an emission of the second light source means;
quarter wavelength plate means, disposed between a magneto-optical recording medium and both the first light source means and the second light source means, for converting one of the linearly polarized lights into a right circularly polarized light and the other of the linearly polarized lights into a left circularly polarized light, wherein the recording medium is magnetized corresponding to recorded information in a first direction perpendicular to a surface of the recording medium and a second direction that is a reverse direction with respect to the first direction;
first reproduced signal generating means, connected to the switching means, for generating a first reproduced signal that is synchronous to the emission of the first light source means, the first reproduced signal being formed in response to an intensity variation of a first reflected light, the first reflected light being a reflected light of the right circularly polarized light from the recording medium; and
second reproduced signal generating means, connected to the switching means, for generating a second reproduced signal that is synchronous to the emission of the second light source means, the second reproduced signal being formed in response to an intensity variation of a second reflected light, the second reflected light being a reflected light of the left circularly polarized light from the recording medium.

9. A reproducing optical device as set forth in claim 8, wherein the switching means comprises:
first high frequency amplifying means for generating a first high frequency signal that causes the first light source means to emit the first linearly polarized light; and
second high frequency amplifying means for generating a second high frequency signal that causes the second light source means to emit the second linearly polarized light,
wherein the second high frequency signal is an inverted signal derived from the first high frequency signal, and the first light source means and the second light source means respectively oscillate laser light in a multi-longitudinal mode.

10. A reproducing optical device as set forth in claim 9, further comprising:
oscillator means for generating a clock pulse having a frequency between 10 MHz and 100 MHz; and
invertor means for receiving the clock pulse and generating an inverted clock pulse,
wherein the first high frequency signal is synchronous to the clock pulse and the second high frequency signal is synchronous to the inverted clock pulse.

11. A reproducing optical device as set forth in claim 10, wherein
the first reproduced signal generating means comprises a photodetector means for receiving the first reflected light and the second reflected light; and third high frequency amplifying means that is supplied with the first high frequency signal from the first high frequency amplifying means,
the second reproduced signal generating means comprises the photodetector means; and fourth high frequency amplifying means that is supplied with the second high frequency signal from the second high frequency amplifying means,
the first reproduced signal, corresponding to a variation in the intensity of the first reflected light received by the photodetector means, is generated by the third high frequency amplifying means when the first high frequency signal is at a high level and
the second reproduced signal, corresponding to a variation in the intensity of the second reflected light received by the photodetector means, is generated by the fourth high frequency amplifying means when the second high frequency signal is at a high level.

12. A reproducing optical device as set forth in claim 10, further including integrating means for integrating the first reproduced signal and generating a first integrated reproduced signal, and for integrating the second reproduced signal and generating a second integrated reproduced signal, and
means for differentially amplifying the first integrated reproduced signal and the second integrated reproduced signal.

13. A reproducing optical device as set forth in claim 8, further including polarization beam splitter means for completely reflecting the first linearly polarized light emitted by the first light source means towards the recording medium and for completely transmitting the second linearly polarized light emitted by the second light source means towards the recording medium,
wherein the polarization beam splitter means is disposed between the quarter wavelength plate means and both the first light source means and the second light source means.

14. A reproducing optical device as set forth in claim 8, wherein:
the quarter wavelength plate means is disposed so that the polarization direction of the first linearly polarized light forms an angle of 45° in an anticlockwise direction with respect to a main axis of the quarter wavelength plate means thereby converting the first linearly polarized light into the right circularly polarized light, and so that the polarization direction of the second linearly polarized light forms an angle of 45° in an clockwise direction with respect to the main axis of the quarter wavelength plate means thereby converting the second linearly polarized light into the left circularly polarized light; and
an optical path difference between the first linearly polarized light and the second linearly polarized light has a permissible range of a quarter wavelength ±20%.

15. A reproducing optical device as set forth in claim 8, further including:
polarization beam splitter means, disposed between the quarter wavelength plate means and both the first light source means and the second light source means, for receiving a P polarized light converted by the quarter wavelength plate means from the right circularly polarized light and an S polarized light converted by the quarter wavelength plate means from the left circularly polarized light, and for splitting a path of the P polarized light and a path of the S polarized light according to a difference in polarization directions thereof.

16. A reproducing optical device as set forth in claim 15, wherein:
the first reproduced signal generating means includes first photodetector means for receiving the P polarized light that is split by the polarization beam splitter means and for generating the first reproduced signal, and
the second reproduced signal generating means includes second photodetector means for receiving the S polarized light that is split by the polarization beam splitter means and for generating the second reproduced signal.

17. A method for reading a magneto-optical recording medium carrying recorded information in a first direction perpendicular to a surface of the recording medium and a second direction that is a reverse direction with respect to the first direction, said method comprising:
simultaneously directing a right circularly polarized light;
and a left circularly polarized light onto a beam spot on said recording medium;
generating a first reproduced signal that corresponds to a variation due to circular dichroism such that intensity of a first reflected light is strong corresponding to recorded information in the first direction and is weak corresponding to recorded information in the second direction, the first reflected light being a reflected light of the right circularly polarized light from said recording medium,
generating a second reproduced signal that corresponds to a variation due to circular dichroism between weak intensity of a second reflected light, corresponding to recorded information in the first direction, and strong intensity of the second reflected light, corresponding to recorded information in the second direction, the second reflected light being a reflected light of the left circularly polarized light from the recording medium; and
differentially amplifying the first reproduced signal and the second reproduced signal to reproduce an output signal corresponding to the recorded information.

18. The method of claim 17 further comprising the steps of emitting linearly polarized lights whose polarization directions are mutually orthogonal and converting the linearly polarized lights into the right circularly polarized light and the left circularly polarized light.

19. The method of claim 17 further comprising splitting a path of the first reflected light from a path of the second reflected light according to a difference in wavelengths between the first reflected light and the second reflected light.

20. The method of claim 17 further comprising converting the first reflected light and the second reflected light into linearly polarized lights having mutually orthogonal polarization directions.

21. A method for reading a magneto-optical recording medium bearing recorded information in a first direction perpendicular to a surface of the recording medium and a second direction that is a reverse direction with respect to the first direction, said method comprising:
  alternately switching between emitting a first linearly polarized light and emitting a second linearly polarized light whose polarization direction is orthogonal to the polarization direction of the first linearly polarized light;
  converting one of the linearly polarized lights into a right circularly polarized light and converting the other of the linearly polarized lights into a left circularly polarized light;
  generating a first reproduced signal that is synchronous to the emission of the first linearly polarized light, the first reproduced signal corresponding to a variation due to the circular dichroism effect such that intensity of a first reflected light is strong corresponding to the first direction and is weak corresponding to the second direction, the first reflected light being a reflected light of the right circularly polarized light from the recording medium; and
  generating a second reproduced signal that is synchronous to the direction of the second linearly polarized light, the second reproduced signal corresponding to a variation due to the circular dichroism effect between weak intensity of a second reflected light, with respect to the first direction and strong intensity to the second reflected light with respect to the second direction, the second reflected light being a reflected light of the left circularly polarized light from the recording medium.

22. The method of claim 21 further comprising integrating the first reproduced signal and generating a first integrated reproduced signal, integrating the second reproduced signal and generating a second integrated reproduced signal, and differentially amplifying the first integrated reproduced signal and the second integrated reproduced signal.

23. A reproducing optical device for a magneto-optical recording medium, comprising:
  first light source means for emitting a first linearly polarized light;
  second light source means for emitting a second linearly polarized light whose polarization direction is orthogonal to the polarization direction of the first linearly polarized light;
  switching means for generating an ON/OFF signal for alternately switching between an emission of the first light source means and an emission of the second light source means;
  quarter wavelength plate means, disposed between a magneto-optical recording medium and both the first light source means and the second light source means, for converging one of the linearly polarized lights into a right circularly polarized light and the other of the linearly polarized lights into a left circularly polarized light;
  optical means for converging a first reflected light from the magneto-optical recording medium and a second reflected light therefrom into a same converging point the first reflected light being derived from the right circularly polarized light, the second reflected light being derived from the left circularly polarized light;
  detecting means, located at the converging point, for alternately receiving the first reflected light and the second reflected light and for releasing a detected signal;
  first reproduced signal generating means, connected to the switching means and the detecting means, for generating a first reproduced signal that is synchronous to the emission of the first light source means, the first reproduced signal being formed in response to an intensity variation of the first reflected light; and
  second reproduced signal generating means, connected to the switching means and the detecting means, for generating a second reproduced signal that is synchronous to the emission of the second light source means, the second reproduced signal being formed in response to an intensity variation of the second reflected light.

24. A reproducing optical device as set forth in claim 23, wherein the switching means comprises:
  first high frequency amplifying means for generating a first high frequency signal that causes the first light source means to emit the first linearly polarized light; and
  second high frequency amplifying means for generating a second high frequency signal that causes the second light source means to emit the second linearly polarized light,
  wherein the second high frequency signal is an inverted signal derived from the first high frequency signal, and the first light source means and the second light source means respectively oscillate laser light in a multi-longitudinal mode.

25. A reproducing optical device as set forth in claim 24, further comprising:
  oscillator means for generating a clock pulse having a frequency between 10 MHz and 100 MHz; and
  invertor means for receiving the clock pulse and generating an inverted clock pulse,
  wherein the first high frequency signal is synchronous to the clock pulse and the second high frequency signal is synchronous to the inverted clock pulse.

26. A reproducing optical device as set forth in claim 25, wherein
  the first reproduced signal generating means comprises a third high frequency amplifying means that is supplied with the first high frequency signal from the first high frequency amplifying means,
  the second reproduced signal generating means comprises a fourth high frequency amplifying means that is supplied with the second high frequency signal from the second high frequency amplifying means,
  the first reproduced signal, corresponding to a variation in the intensity of the first reflected light received by the detecting means, is generated by the third high frequency amplifying means when the first high frequency signal is at a high level and the second reproduced signal, corresponding to a variation in the intensity of the second reflected light received by the detecting means, is generated by the fourth high frequency amplifying means when the second high frequency signal is at a high level.

27. A reproducing optical device as set forth in claim 23, further including polarization beam splitter means for completely reflecting the first linearly polarized light emitted by the first light source means towards the recording medium and for completely transmitting the second linearly polarized light emitted by the second light source means towards the recording medium, wherein the polarization beam splitter means is disposed between the quarter wavelength plate means and both the first light source means and the second light source means.

28. A reproducing optical device as set forth in claim 23 wherein:

the quarter wavelength plate means is disposed so that the polarization direction of the first linearly polarized light forms an angle of 45° in an anti-clockwise direction with respect to a main axis of the quarter wavelength plate means thereby converting the first linearly polarized light into the right circularly polarized light, and so that the polarization direction of the second linearly polarized light forms an angle of 45° in a clockwise direction with respect to the main axis of the quarter wavelength plate means thereby converting the second linearly polarized light into the left circularly polarized light; and an optical path difference between the first linearly polarized light and the second linearly polarized light has a permissible range of a quarter wavelength ±20%.

29. A reproducing optical device as set forth in claim 23, further including:

polarization beam splitter means, disposed between the quarter wavelength plate means and both the first light source means and the second light source means, for receiving a P polarized light converted by the quarter wavelength plate means from the right circularly polarized light and an S polarized light converted by the quarter wavelength plate means from the left circularly polarized light, and for splitting a path of the P polarized light and a path of the S polarized light according to a difference in polarization directions thereof.

30. A reproducing optical device as set forth in claim 29, wherein:

said detecting means receives the P polarized light that is split by the polarization beam splitter means for use by said first reproduced signal generating means to generate the first reproduced signal, and said detecting means receives the S polarized light that is split by the polarization beam splitter means for use by said second reproduced signal generating means to generate the second reproduced signal.

31. A reproducing optical device as set forth in claim 23, further including integrating means for integrating the first reproduced signal and generating a first integrated reproduced signal, and for integrating the second reproduced signal and generating a second integrated reproduced signal, and means for differentially amplifying the first integrated reproduced signal and the second integrated reproduced signal.

* * * * *